(12) United States Patent
Albrecht

(10) Patent No.: US 7,483,363 B2
(45) Date of Patent: Jan. 27, 2009

(54) DATA STORAGE DEVICE AND METHOD FOR OPERATING A DATA STORAGE DEVICE

(75) Inventor: Thomas R. Albrecht, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 646 days.

(21) Appl. No.: 11/249,287

(22) Filed: Oct. 13, 2005

(65) Prior Publication Data
US 2006/0083152 A1    Apr. 20, 2006

(30) Foreign Application Priority Data
Oct. 14, 2004 (EP) ................... 04405641

(51) Int. Cl.
*G11B 9/00* (2006.01)
(52) U.S. Cl. ....................... 369/126; 977/947
(58) Field of Classification Search ........................ None
See application file for complete search history.

(56) References Cited

U.S. PATENT DOCUMENTS 4,064,539 A * 12/1977 Lewiner et al. .......... 369/53.41
4,343,993 A * 8/1982 Binnig et al. ................ 250/306
6,621,664 B1 * 9/2003 Trindade et al. ............ 360/318

FOREIGN PATENT DOCUMENTS

EP    0223918 B1 * 6/1987
EP    1385161 A2 * 1/2004

OTHER PUBLICATIONS

P. Vettiger et al., "The millipede—more than 1,000 tips for future AFM data storage", Mar. 2000, IBM Journal Research Development, vol. 44, No. 3.*

* cited by examiner

*Primary Examiner*—Peter Vincent Agustin
(74) *Attorney, Agent, or Firm*—Arthur Ortega

(57) ABSTRACT

A data storage device comprising a storage medium for storing data in the form of marks. An array of probes is mounted on a common frame. The common frame and the storage medium are designed for moving relative to each other for creating or detecting marks. Each probe is assigned a given field within the storage medium for creating or detecting marks in various tracks. A track density is representative of the distance between consecutive tracks. A linear density is representative of a minimum distance between consecutive marks within one track. The data storage device is designed for grouping the probes into various probe classes, each probe class being characterized in that all its assigned probes are controlled with a common track density and in that all its assigned probes are operated in respect of track movement simultaneously. Each probe class is controlled with a different combination of track density and linear density.

16 Claims, 5 Drawing Sheets

| CL | TR_S | CLK_S |
|---|---|---|
| CL1 | TR_S1 | CLK_S |
| CL2 | TR_S2 | CLK_S |
| CL3 | TR_S3 | CLK_S |
| CL4 | TR_S4 | CLK_S |
| CL5 | TR_S5 | CLK_S |
| CL6 | TR_S6 | CLK_S |
| CL7 | TR_S7 | CLK_S |
| CL8 | TR_S8 | CLK_S |
| CL9 | TR_S9 | CLK_S |
| CL10 | TR_S10 | CLK_S |
| CL11 | TR_S11 | CLK_S |
| CL12 | TR_S12 | CLK_S |
| CL13 | TR_S13 | CLK_S |
| CL14 | TR_S14 | CLK_S |
| CL15 | TR_S15 | CLK_S |
| CL16 | TR_S16 | CLK_S |

| CL | TR_S | CLK_S |
|---|---|---|
| CL1 | TR_S | CLK_S1 |
| CL2 | TR_S | CLK_S2 |
| CL3 | TR_S | CLK_S3 |
| CL4 | TR_S | CLK_S4 |
| CL5 | TR_S | CLK_S5 |
| CL6 | TR_S | CLK_S6 |
| CL7 | TR_S | CLK_S7 |
| CL8 | TR_S | CLK_S8 |
| CL9 | TR_S | CLK_S9 |
| CL10 | TR_S | CLK_S10 |
| CL11 | TR_S | CLK_S11 |
| CL12 | TR_S | CLK_S12 |
| CL13 | TR_S | CLK_S13 |
| CL14 | TR_S | CLK_S14 |
| CL15 | TR_S | CLK_S15 |
| CL16 | TR_S | CLK_S16 |

Fig. 9

| CL | TR_S | CLK_S |
|---|---|---|
| CL1 | TR_S1 | CLK_S1 |
| CL2 | TR_S2 | CLK_S1 |
| CL3 | TR_S2 | CLK_S3 |
| CL4 | TR_S4 | CLK_S1 |
| CL5 | TR_S4 | CLK_S3 |
| CL6 | TR_S4 | CLK_S6 |
| CL7 | TR_S5 | CLK_S7 |
| CL8 | TR_S5 | CLK_S8 |
| CL9 | TR_S5 | CLK_S9 |
| CL10 | TR_S10 | CLK_S10 |
| CL11 | TR_S10 | CLK_S11 |
| CL12 | TR_S11 | CLK_S1 |
| CL13 | TR_S11 | CLK_S5 |
| CL14 | TR_S14 | CLK_S12 |
| CL15 | TR_S15 | CLK_S15 |
| CL16 | TR_S16 | CLK_S3 |

Fig. 10

| CL | TR_S | CLK_S | |
|---|---|---|---|
| CL1 | TR_S1 | CLK_S1 | CLK_S3 |
| CL2 | TR_S2 | CLK_S1 | CLK_S6 |
| CL3 | TR_S2 | | CLK_S7 |
| CL4 | TR_S4 | CLK_S1 | CLK_S8 |
| CL5 | TR_S4 | CLK_S3 | CLK_S9 |
| CL6 | TR_S4 | CLK_S6 | CLK_S10 |
| CL7 | TR_S5 | CLK_S7 | CLK_S1 |
| CL8 | TR_S5 | CLK_S8 | CLK_S1 |
| CL9 | TR_S5 | | CLK_S3 |
| CL10 | TR_S10 | CLK_S10 | CLK_S1 |
| CL11 | TR_S10 | CLK_S11 | CLK_S3 |
| CL12 | TR_S11 | CLK_S1 | CLK_S6 |
| CL13 | TR_S11 | CLK_S5 | |
| CL14 | TR_S14 | CLK_S12 | CLK_S9 |
| CL15 | TR_S15 | | CLK_S10 |
| CL16 | TR_S16 | CLK_S3 | CLK_S11 |
| | | | CLK_S1 |
| | | | CLK_S5 |
| | | | CLK_S12 |
| | | | CLK_S15 |

Fig. 11

DATA STORAGE DEVICE AND METHOD FOR OPERATING A DATA STORAGE DEVICE

CROSS-REFERENCE TO RELATED APPLICATIONS

This application claims the priority benefit under 35 USC 119 of European patent application 04405641.4, filed Oct. 14, 2004, and incorporated herein by in its entirety:

BACKGROUND OF THE INVENTION

1. Technical Field of The Invention

The present invention relates to a data storage device for storing data and a method for operating a data storage device.

2. Background Art

In the field of this invention techniques are known that use nanometer sharp tips for imaging and investigating the structure of materials down to the atomic scale. Such techniques include scanning tunneling microscopy (STM) and atomic force microscopy (AFM), as disclosed in U.S. Pat. No. 4,343,993 and EP 0 223 918 B1.

Based on the developments of the scanning tunneling microscopy and the atomic force microscopy, new storage concepts have been introduced over the past few years profiting from these technologies. Probes having a nanoscale tip are being introduced for modifying the topography and for scanning an appropriate storage medium. Data are written as sequences of bits represented by topographical marks, such as indentation marks and non-indentation marks. The tips comprise apexes with a radius in the lower nanometer range and the indentation marks have for example a diameter in the range of 30 to 40 nm. Hence, these data storage concepts promise ultra-high storage area density.

In STM a sharp tip is scanned in close proximity to the surface and voltage applied between the tip and the surface gives rise to a tunnel current that depends on the tip-surface separation. From a data-storage point of view, such a technique may be used to image or sense topographic changes on a flat medium that represent a stored information in logical "0"s and "1"s. In order to achieve reasonable stable current, the tip-sample separation must be maintained extremely small and fairly constant. In STM, the surface to be scanned needs to be of a conductive material.

In AFM, the sharp tip rests on one end of a soft spring cantilever. When the sharp tip is in close proximity to a surface inter atomic forces may be sensed, which result in bending of the spring cantilever.

A storage device for storing data based on the AFM principle is disclosed in "The millipede—more than 1,000 tips for future AFM data storage" by P. Vettiger et al., IBM Journal Research Development, Vol. 44, No. 3, March 2000. The storage device has a read and write function based on a mechanical x-, y-scanning of a storage medium with an array of probes each having a tip. The probes scan during the operation an assigned field of the storage medium in parallel. That way high data rates may be achieved. The storage medium comprises a thin polymethylmethacrylate (PMMA) layer. The tips are moved across the surface of the polymer layer in a contact mode. The contact mode is achieved by applying small forces to the probes so that the tips of the probes can touch the surface of the storage medium. For that purpose, the probes comprise cantilevers which carry the sharp tips on their end sections. Bits are represented by indentation marks or non-indentation marks in the polymer layer. The cantilevers respond to these topographic changes in the surface while they are moved across the surface. Indentation marks are formed on the polymer surface by thermomechanical recording. This is achieved by heating a respective probe with a current or voltage pulse during the contact mode in a way that the polymer layer is softened locally where the tip touches the polymer layer. The result is a small indentation on the layer having a nanoscale diameter.

Reading is also accomplished by a thermomechanical concept. The heater cantilever is supplied with an amount of electrical energy, which causes the probe to heat up to a temperature that is not high enough to soften the polymer layer as is necessary for writing. The thermal sensing is based on the fact that the thermal conductance between the probe and the storage medium, especially a substrate on the storage medium, changes when the probe is moving in an indentation as the heat transport is in this case more efficient. As a consequence of this, the temperature of the cantilever decreases and hence, also its resistance changes. This change of resistance is then measured and serves as the measuring signal. Reading and also writing the marks is accomplished by moving the probes relative to the storage medium in lines within a track and moving to the next track when the end of the respective line has been reached.

Applicants EP 1 385 161 A2 discloses a storage device and a method for scanning a storage medium. The storage medium is designed for storing data in the form of marks and is scanned by an array of probes for mark detecting purposes in a scanning mode. The storage medium has fields with each field to be scanned by an associated one of the probes. At least one of the fields comprises marks representing operational data for operating the scanning mode. Scanning parameters are computed from the operational data and the scanning mode is adjusted according to the scanning parameters. The marks representing operational data may represent information for adjusting a tracking position. For that purpose, special marks are formed in respective fields of the storage medium, which are located in different positions relative to a track center line. By scanning these marks, information of the actual position of the probes relative to the track center line can be derived and used for adjusting a tracking positioning. Other fields comprise marks located in a periodic manner along respective lines within tracks. By scanning these fields, timing or clocking information may be obtained, which is used for adjusting the frequency of reading, writing or erasing pulses applied to the probes. These clocking or tracking adjustments take effect for all of the fields and the respective allocated probes.

It is a challenge to provide a data storage device and a method for operating a data storage device with a high data density and a low data loss rate.

SUMMARY OF THE INVENTION

According to a first aspect of the invention, a data storage device is provided, comprising a storage medium for storing data in the form of marks, an array of probes being mounted on a common frame, the common frame and the storage medium being designed for moving relative to each other for creating or detecting marks. Each probe given a field is assigned within the storage medium for creating or detecting marks in various tracks. A track density is representative of a minimum distance between consecutive tracks. A linear density is representative of a minimum distance between consecutive marks within one track. The data storage device is designed for grouping the probes into various probe classes, each probe class being characterized in that all its assigned probes are controlled with a common track density and in that all its assigned probes are operated in respect of track movement simultaneously. The data storage device is further designed for controlling each probe classes with a different combination of track density and linear density.

Track movement is the movement of the respective probes from one track to the next track. Operating all probes assigned to one probe class with a common track density helps to keep a data rate for retrieving information from or writing information to the data storage device at a high level. According to said first aspect of the invention, it is possible to adjust the size of the probe classes to obtain the desired data rate. In that way, the desired data rate may be optimized in view of a possible data storage density. According to the invention, it is within these given limits possible to optimize in view of the different physical properties of the individual probes the data density taking into consideration the desired data rate.

In an advantageous embodiment of the first aspect of the invention, said data storage device is designed for controlling each probe class with a different areal density. The areal density is given by a product of the track density and the linear density. By controlling each probe class with a different areal density, a medium capacity gain may be obtained relative to a constant fixed format data storage device. The different areal densities may be achieved by varying the linear and/or the track density among the different probe classes.

In a further advantageous embodiment of the first aspect of the invention, the data storage device is designed for controlling at least one probe class with a varying linear density within the respective probe class. This has the advantage of a very high capacity gain relative to a constant fixed format data storage device. The capacity gain is the higher the more classes are being controlled with a varying linear density yielding to further optimizing the data density and on the other hand enabling high data transfer rates. Varying the linear density is simply possible without negatively affecting data rates as this merely affects the timing of bits along universally defined—at least within a probe class—track center lines.

In a further advantageous embodiment of the first aspect of the invention, the data storage device is designed for controlling all the probe classes with the same track density and with different linear densities among the probe classes. This has the advantage that it is simple to implement and only a few operational data fields are necessary, which provide the basis for clocking and tracking signals.

In a further advantageous embodiment of the first aspect of the invention, at least one servo field is dedicated per track density being operated. This has the advantage that tracking signals can in a simple way be deduced individually for each track density being operated.

In a further advantageous embodiment of the first aspect of the invention, the storage medium comprises a number of clocking fields being equal to the amount of different linear densities. This has the advantage that the different needed clocking signals can be directly deduced from the respective clocking fields.

In a further advantageous embodiment of the first aspect of the invention, said data storage device comprises a synthesizer that is designed for creating clocking signals for implementing different linear densities with the clocking signals being derived from a single clocking field. This reduces the overhead needed for clocking fields as less clocking fields are necessary, which yields to a higher overall data density.

In this respect, it is advantageous, if said synthesizer comprises a phase locked loop and is provided with frequency dividers. Such a synthesizer is simple to implement for creating clocking signals of different frequencies with a fixed phase relationship to the clocking signal derived directly from the clocking information inherent with the single clocking field if frequencies are rational multiples of that primary clocking signal frequency.

In a further advantageous embodiment of the first aspect of the invention, said storage medium is partitioned into physical sections and all probes of each class are allocated only to one section each. Each probe class within one physical section is controlled with a different combination of track density and linear density. In that way, negative effects of thermal expansion are lessened, as such negative effects decrease with a local proximity of commonly operated probes. The negative effects of thermal expansion may yield higher error rates.

According to a second aspect of the invention, a method for operating a data storage device is provided, wherein said probes are grouped into various probe classes, each probe class being characterized in that all its assigned probes are controlled with a common track density and in that all its assigned probes are operated in respect of track movement simultaneously, and wherein each probe class is controlled with a different combination of track density and linear density.

In an advantageous embodiment of the second aspect of the invention, each probe class is controlled with a different areal density. In a further advantageous embodiment of the second aspect of the invention, at least one probe class is controlled with a varying linear density within the respective probe class.

In a further advantageous embodiment of the second aspect of the invention, all probe classes are controlled with the same track density and with different linear densities among the probe classes.

In a further advantageous embodiment of the method, clocking signals for implementing said different linear densities are created with a synthesizer with clocking signals being derived from a single clock field.

In a further advantageous embodiment of the method, said synthesizer comprises a phase locked loop, is provided with frequency dividers and the frequency dividers are operated with given divisors for obtaining the desired frequencies for said signals.

In a further advantageous embodiment of the method, said storage medium is partitioned into physical sections and all probes of each class are allocated only to one section each and each probe class within one physical section is controlled with a different combination of track density and linear density.

The advantages of the various embodiments of the method for operating the storage device correspond to the respective embodiments of the data storage device.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE PREFERRED EMBODIMENT

Figure 1:
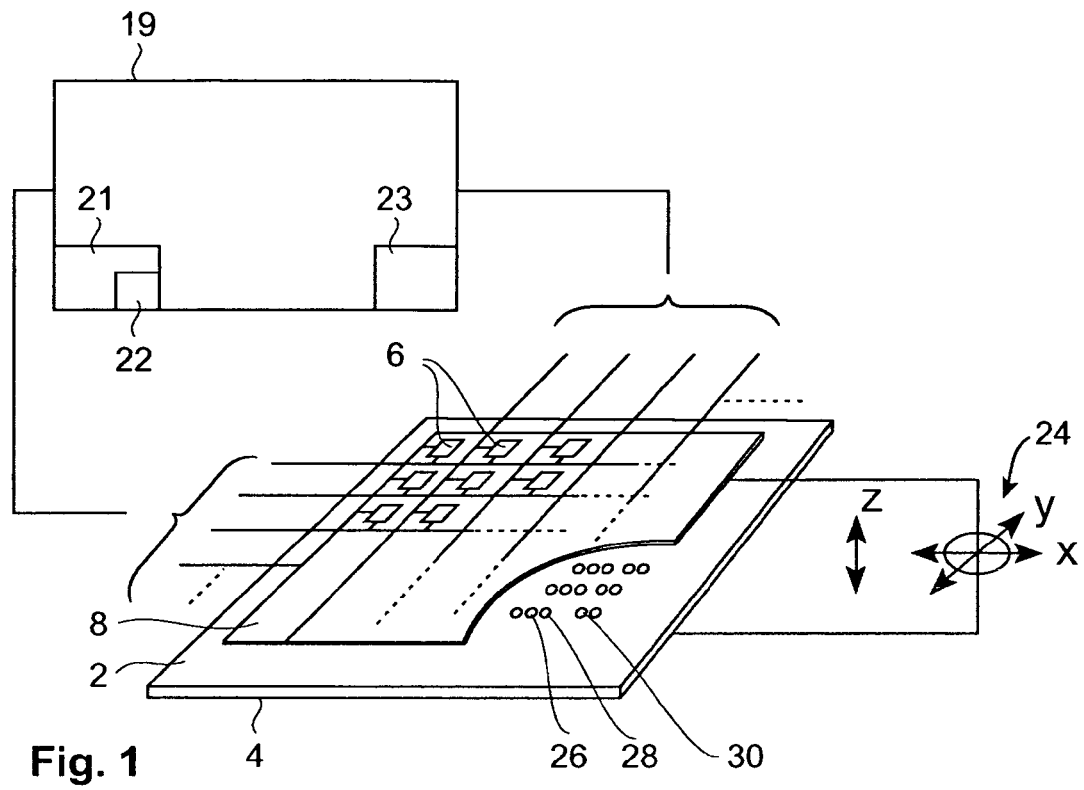
FIG. 1, a perspective view of a data storage device.

FIG. 1 shows a perspective view of a data storage device. The data storage device comprises a storage medium 2, that is preferably formed by a polymer layer. The polymer layer is preferably formed of a thin polymethylmethacryllate (PMMA) layer. The storage medium 2 may, however, also consist of different materials like an electrically conductive material or magnetic material. The storage medium 2 is supported by a substrate 4. The substrate 4 is preferably formed of silicon.

An array of probes 6 is mounted on a common frame 8. Only a few probes are shown in FIG. 1. The storage device may, however, comprise a vast number of probes, such as 1024 or even a significantly larger number of probes 6.

Each probe 6 comprises terminals, which each are electrically connected to a control and information processing unit 19 via electrically conductive lines. The terminals may all be individually connected to the control and information processing unit 19. However, in order to reduce the complexity of the wiring, the terminals of the individual probes 6 may also be connected via row-lines 18 and column-lines 20 and possibly via non-shown multiplexers to the control and information processing unit 19.

The control and information processing unit 19 is designed for creating control parameters applied to the probes 6 via the terminals or sensing parameters present on the terminals, such as a current or a voltage potential, for a write or read modus. The control and information processing unit 19 is further designed for controlling a movement of the storage medium 8 and the substrate 2 relative to the frame 8 in an x-, y- and z-direction. The actuation for this is accomplished by a scanner 24.

Hence, the storage medium 2 and the frame 8 containing the probes 6 are movable relative to each other. In an alternative embodiment, the scanner 24 may act on the frame in order to move the frame in the x-, y- and z-direction relative to the storage medium 2 and the substrate 4. A relative movement in a z-direction may also be accomplished by applying respective electrostatic forces on the probes 6 possibly containing a capacitive platform forming a first electrode of a capacitor further comprising a second electrode being arranged in a fixed position relative to the storage medium 2.

In the storage medium 2 marks 26 to 30 are present, which represent a logical information. Preferably, they form topographic marks and may represent as indentation marks logical "1"s whereas the absence of the indentation marks may represent logical "0"s. The marks 26 to 30 are of a nanoscale diameter. In FIG. 1, only a few marks 26 to 30 are shown, which also do not represent their real physical properties. The few marks 26 to 30 are just shown by way of example.

Marks 26-30 representing more logic values then, too, are included. Marks according to the invention are not limited to certain physical properties. Marks can be represented by topographic properties such as the above-mentioned indentation marks, on or in the storage medium or by electrical properties or by optical properties, or even by chemical properties. Marks may, for example, be represented by charge trap properties in a semi-conductor-oxide-dielectric structure. They may have amorphous or crystalline phase properties to be detected.

Figures 2, 3:
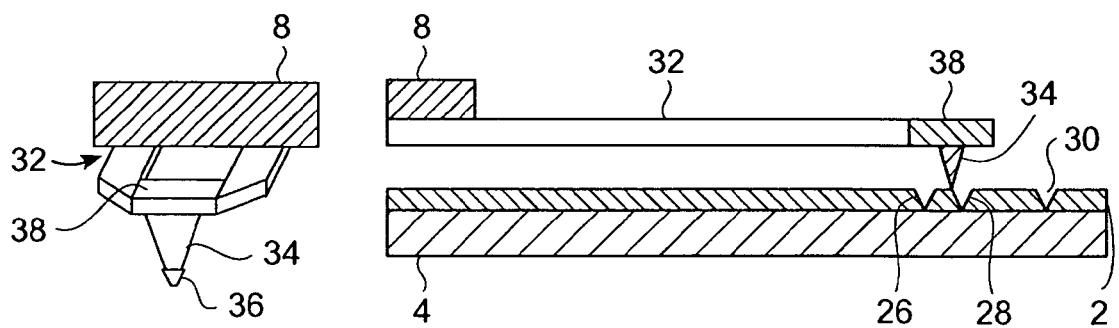
FIG. 2, a cross-sectional view of part of the data storage device according to FIG. 1, FIG. 3, a probe arranged in the data storage device according to FIG. 1, FIG. 4, a further view of the data storage device according to FIG. 1, FIG. 5, a detailed view of part of a field assigned to a probe of the data storage device, FIG. 6, a program being processed during the operation of the data storage device while operating in a write modus, FIG. 7, a further program being processed during the operation of the data storage device while operating in a read modus, FIGS. 8 to 11, tables showing different embodiments of the data storage device concerning the allocation of tracking signals and clocking signals to the probes of the different probe classes.

In FIG. 2, a cross-sectional view of the data storage device according to FIG. 1 is shown. Part of a probe 6 is shown. The probe 6 comprises a spring cantilever 32 on which a tip 34 is mounted having an apex having a radius in the low nanometer range. The marks 26-30, shown as indentation marks, are formed by pushing the apex 6 of the tip 34 into the storage medium 2.

The probe 6 comprises the spring cantilever 32 and a write/read element 38. The write/read element 38 may be formed as a temperature dependent resistor, which is thermally coupled to the tip 34. The write/read element 38 may, however, also comprise separate write and read elements. They are then preferably at least on one side connected to different terminals of the probe 6 and are in that way independently controllable. Such separately formed write and read elements have the advantage that they may be designed specifically for purposes necessary for the write and, respectively, the read modus. The read element may instead of being a temperature dependent resistor also be formed as a capacitive platform. Depending on the particular application, the write/read element 38 or the write element may be embodied as a further capacitive platform. If the further capacitive platform is present, a further electrode arranged in a fixed position to the storage medium 2 is provided. By appropriately charging the capacitor formed by the further capacitive platform and the respective electrode may be charged accordingly in order to provide the probe 6 with a suitable electrostatic force pushing the tip 34 during the write modus into the storage medium 2 in order to form the marks 26-30. This way of creating marks 26-30 may also be referred to as in "a cold writing".

The cantilever 32 may comprise one to three legs. The amount of legs is not necessarily coupled to the amount of terminals necessary to control the different electrical elements of the probe 6. They are primarily chosen in order to obtain the desired mechanical properties of the probe. In order to provide the necessary electrical connections to the terminals of the probe, either separate legs of the spring cantilever 32 may be provided or also electrical decoupling structures, such as an electrically insulating material. The spring cantilever 32 and the write/read element 38 preferably are fabricated from silicon. Electrically conductive connections to the terminals of the probe consist preferably of highly doped areas of the spring cantilever 32, whereas the write/read element 38 in case of being formed as a temperature dependent resistor may be formed by less doped silicon, which yields a high electrical resistance of, for example, 11 kΩ.

In the presence of the capacitive platform or the further capacitive platform, these platforms are formed by highly doping respective areas formed of silicon. The tip 34 may also be fabricated from silicon and may not be doped or be doped with a varying degree, depending on the application. In case of the AFM based data storage device, the tip 34 does not need to be electrically conductive. In case of an STM based data storage device, the tip, however, needs to be electrically conductive. The tip may also be formed from a different material, such as a magnetic material.

Figure 4:
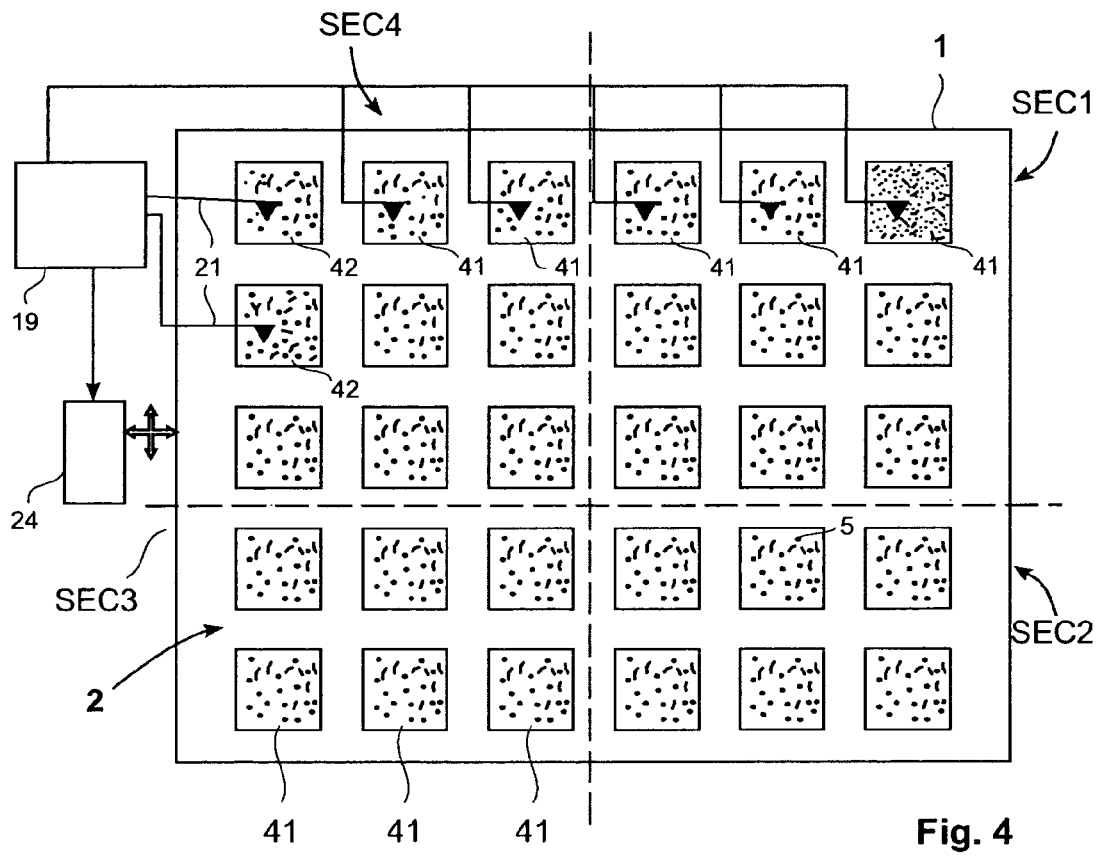

During operation of the data storage device, each probe is moved across its respectively assigned field 41 (FIG. 4). It is moved along lines, each line forming a track. The data are written and respectively read consecutively along the respective lines and at the end of each line the respective probe 6 is moved to the next track.

Figure 5:
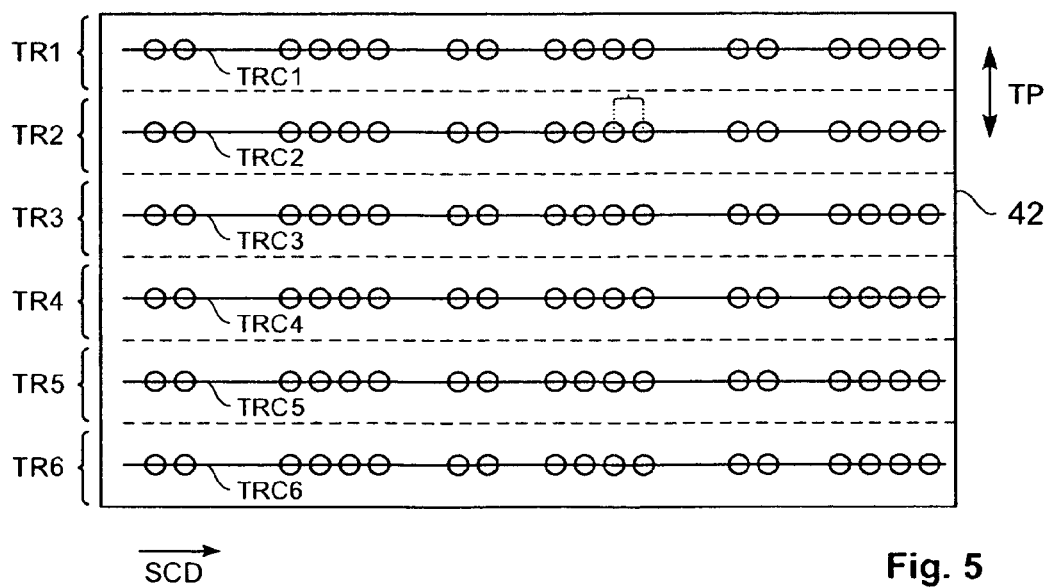
Figure 6:
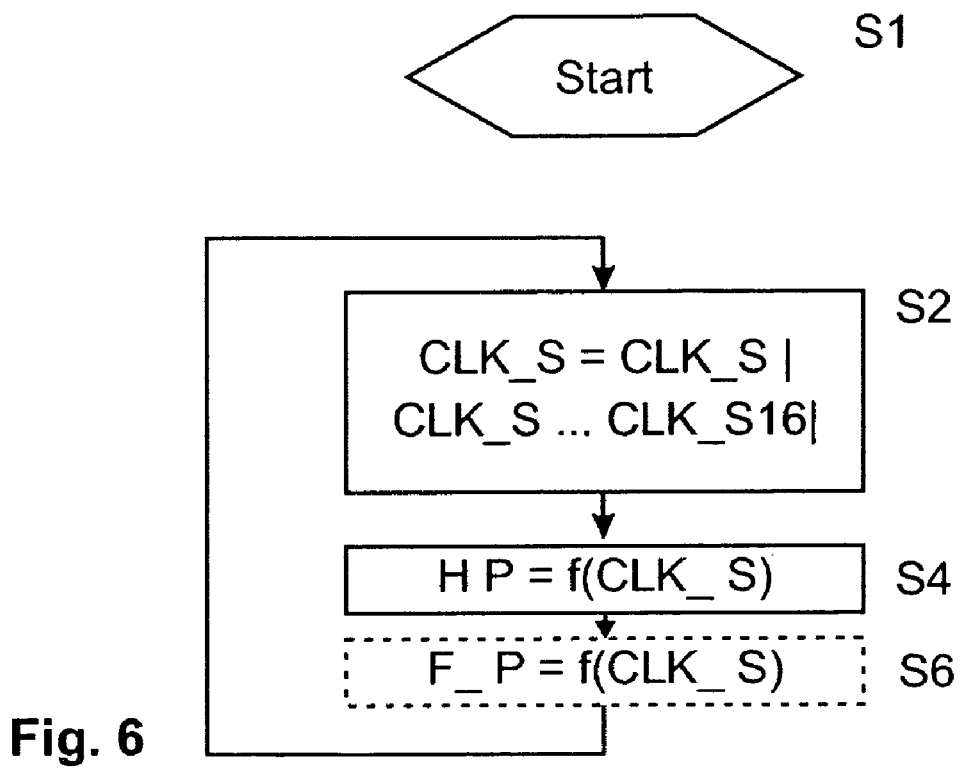
Figure 7:
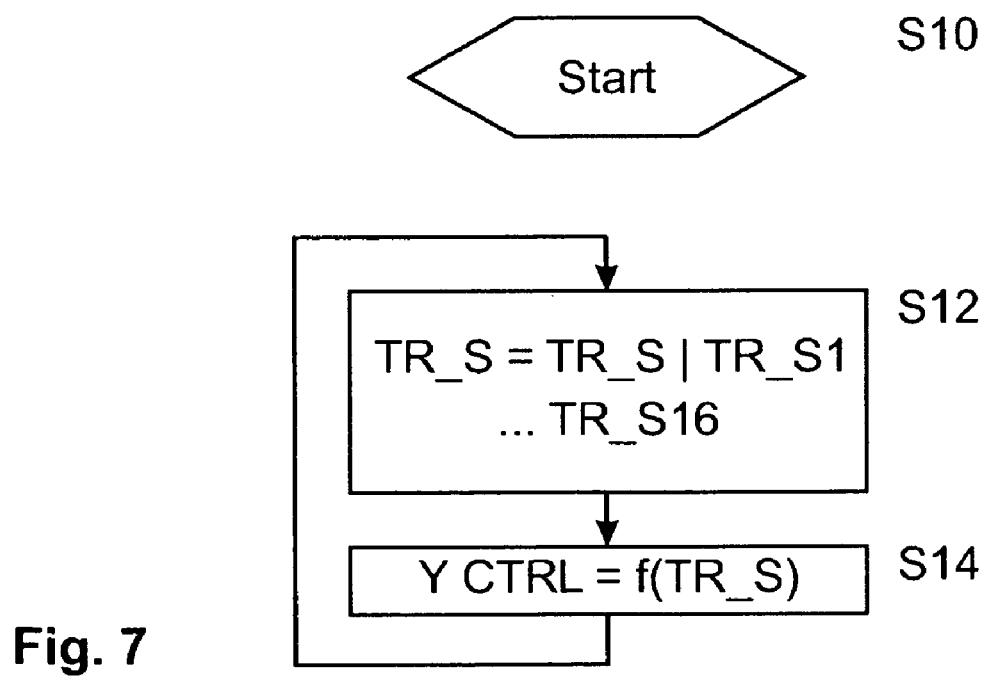

FIG. 5 shows part of a field 41. Tracks TR1-TR6 are shown. Each track has its track center line TRC1 to 6. A distance between two tracks that is between two consecutive track center lines TRC1 to 6 is a track pitch TP. The reciprocal of the track pitch TP is the track density, which is, therefore, representative of the distance between consecutive tracks TR1-TR6. A linear density is given by the reciprocal of a minimum distance between two consecutive marks 26-30 within one track TR1-TR6. The linear density is in that way representative of the minimum distance between consecutive marks 26-30 within one track TR1-TR6. In FIG. 5, a scanning direction SCD is shown.

During the write modus, the probe 6 is scanned in the scanning direction SCD in the line of the respective track TR1-TR6. Marks 26-30 are created by imposing the write/read element 38 in the case of it comprising the temperature dependent resistor with a heating pulse H_P by imposing the write/read element 38 with a respective current or voltage pulse. The heat dissipated from the write/read element softens the storage medium and the tip 34 forms a respective indentation as the mark 26-30 if the spring formed by the cantilever is imposed with a respective force. This force may be inherent with mechanical properties of the spring cantilever 32. It may, however, also be created in another way, such as, for example, by the electrostatic force. In this case, a respective force pulse F_P is imposed to the respective capacitor by charging the capacitor respectively. Alternatively, only a suitably chosen force pulse F_P may be provided if cold writing should be achieved. The heating pulse H_P and also the force pulse F_P need to be timely synchronized in order to achieve the desired linear density. For that purpose, a clocking signal CLK_S is necessary.

During a read modus, the probe 6 is scanned in the scanning direction SCD along each line of the respective track TR1-TR6. When the tip 34 reaches an indentation representing a mark 26-30, the tip 34 moves into the respective indentation as the tip 34 is pressed onto the storage medium 2 with a given spring force. This movement into the respective indentation may then be sensed by exploiting the resulting change in heat dissipation from he write/read element due to changed thermal coupling to the storage medium 2 and the substrate 4. In order to sense this change, the write/read element is either continuously provided with a given voltage or current or electrical power, which heats up the read/write element 38 to a given temperature, for example 400° C., which is low enough to prevent the storage medium 2 from softening in a way that the marks 26-30 degrade. The write/read element 38 may, however, only by provided intermittently with the heat pulse H_P suitably chosen in the amount of electrical power supplied for the read modus in timely synchronization of a possibly expected mark 26-30.

Alternatively, the movement of the spring 32 into a respective indentation may be sensed by sensing a change in the capacity of the capacitor formed by the capacitive platform or a further capacitive platform. This may, for example, be achieved by sensing a change in charge or voltage potential. For that purpose, the respective capacitor may be provided either continuously or intermittently with a given charge or voltage.

In addition to that, the exact location of the probe 6 and its associated tip 34 in respect to the respective track TR1 to 6 needs to be detected and to be adjusted if it is not in line with the track center line TRC1 to 6. For that purpose, a tracking signal TR_S is provided.

FIG. 4 shows various fields of the storage medium 2. A respective probe 6 is assigned to each field. The probes 6 are only scanned across their individually assigned field. Most of the fields contain data used for storing prospective information. These fields are called data fields and by way of example some of them are labeled with the numeral 41. The storage medium 2 is shown in FIG. 4 with thirty fields. It may, however, comprise a different number of fields, such as 1024 or even a way larger number. Some fields contain marks representative of operational data of the storage device, the so-called operational data fields 42. There may, for example, be one or more operational data fields 42 containing marks being formed and located in a way that the clocking signal CLK_S may be deduced by operating the respectively assigned probe 6 in the read modus. For that purpose, such an operational data field 42 may contain consecutive marks 26-30 along each line spaced at the desired minimum distance to each other.

At least one other operational data field 42 comprises marks which are located and formed suitably in a way that the tracking signal TR_S may be deduced when operating the respectively assigned probe 6 in the read modus. For that purpose, the marks may 26-30 be centered on the track center line TRC1-TRC6 or may be located with a given offset to the respective track center line TRC1-TRC6. Such operational data fields 42 may be also be referred to as tracking fields. The first mentioned data fields may be referred to as clocking fields.

If marks in a respective operational data field are suitably located and formed, they may, however, be used for deducing the clock signal CLK_S and also the tracking signal TR_S. In view of these operational data fields and in view of the way of deducing respective clocking signals CLK_S and tracking signals TR_S applicants EP 1 385 161 A2 is incorporated by reference herein. In order to enhance the data density overall for the data storage device, the probes are clustered into various probe classes CL. Each probe class is characterized in that all its assigned probes 6 are controlled with a common track density and in that all its assigned probes are operated in respect of track movement simultaneously. Operating the respectively assigned probes 6 in respect of track movement simultaneously is to be understood in a way that all of these probes are operated simultaneously in either the write modus or the read modus or on the other hand are in an idling modus, during which no data are written nor read. They may however all be operated in one modus at the same time.

In addition to that, the probes 6 of all probe classes CL are controlled with a different combination of track density and linear density. This approach enables to group the probes in view of their physical properties, for example in view of their actual radius of their respective apex 36 to achieve a higher data density. Grouping the probes into probe classes CL reduces on the other hand the necessary effort for wiring the electrically conductive lines between the control and information processing unit 19 and the respective terminals of the probes 6 and also the individual effort for controlling the respective probes 6. Specific examples of how the tracking signal TR_S and the clocking signal CLK_S may be allocated to the respective probe class CL are shown in FIGS. 8 to 11.

Figures 8, 12:
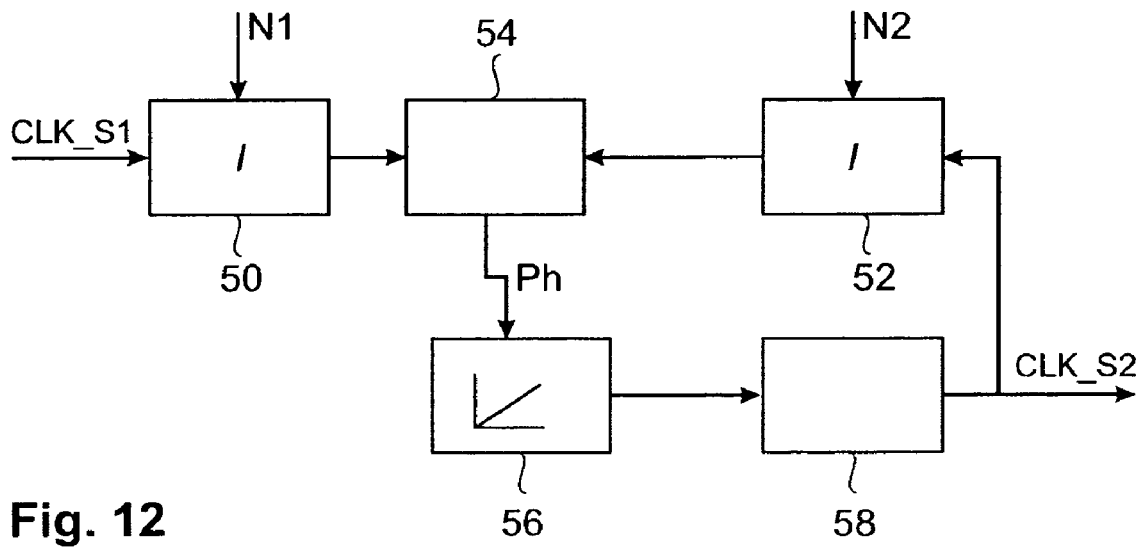
FIG. 12 is a preferred embodiment of a synthesizer being part of the data storage device.

FIG. 8 shows a table representative of a first embodiment of grouping the probes into the probe classes CL. The probes are grouped into 16 probe classes CL1 to CL16. In other cases, there may, however, be more or less probe classes CL. Each of the 16 probe classes CL1 to CL16 is assigned the same clock signal CLK_S. This has the advantage that only one clocking signal CLK_S needs to be generated and therefore, at minimum only one clocking field is necessary. The 16 probe classes CL1 to CL16, however, have different tracking signals TR_S1 to TR_S16 assigned to each of them. For example, the tracking signal TR_S1 might have the effect of a fairly low track density whereas, for example, the tracking signal TR_S16 may result in a very high track density. The other tracking signals TR_S2 to TR_S15 may lead to track densities lying between the aforementioned two track densities. The respective probes are allocated to the various probe classes CL1 to CL16 taking into consideration error rates resulting from erasure of neighboring indentation marks during the write modus or not correctly detecting marks during a read modus.

The tracking signals TR_S1 to TR_S16 are preferably deduced from respective tracking fields. For that purpose, a tracking signal unit 23 is provided in the control and information processing unit 19. It is, however, also possible to deduce from one tracking field more than one tracking signal if the tracking signal unit 23 contains data representative of values of the various track densities and transforms by signal processing, for example, the tracking signal TR_S1 into the tracking signal TR_S5.

In a second embodiment of the probe classes CL (FIG. 9), the same tracking signal TR_S is assigned to all probe classes CL1 to CL16. This reduces the effort needed to create the tracking signals TR_S and enables to achieve very high data rates, as in this case various probe classes CL1 to CL16 may be operated in the reading or writing modus simultaneously. Various probe classes CL1 to CL16 are in this embodiment, however, assigned a different clocking signal CLK_S1 to CLK_S16. The different clocking signals CLK_S1 to CLK_S16 may be deduced during respective read modi of respectively assigned clocking fields. The different clocking signals CLK_S1 to CLK_S16 may, however, also be deduced from a lower number of clocking fields if the control and information processing unit 19 is provided with a synthesizer 22 within a clocking signal unit 21. The synthesizer 22 is described in further detail below. By way of example, the clocking signal CLK_S1 may have the lowest frequency whereas the clocking signal CLK_S16 may have the highest frequency. The other clocking signals CLK_S2 to CLK_S15 may have a frequency below these two mentioned frequencies. However, also every other combination of frequencies may be used.

A third embodiment for assigning respective tracking signals TR_S and clock signals CLK_S to the various classes CL of probes 6 is shown with reference to the table of FIG. 10. In this embodiment, the combination of the respective tracking signal TR_S and respective clocking signal CLK_S for each of the classes CL1 to CL16 of the probes 6 differs from each other. With this embodiment an even a higher data density may be achieved compared to the first embodiments, as in this third embodiment an areal density, that is the product of the track density and the linear density, may be equal for two classes. In that way, a probe 6, which is only capable of being operated with a track density corresponding to the tracking signal TR_S4 is not limited to being operated with a linear density corresponding to the clocking signal CLK_S1 but may, as in this case by way of example is shown, be operated with a linear density resulting from applying a clocking signal CLK_S6. This gives more freedom for optimizing the overall data density of the storage device.

A fourth embodiment for assigning the tracking signals TR_S and the clocking signals CLK_S to the respective probe classes CL is shown by reference to FIG. 11. The assigned tracking signals TR_S may vary from probe class to probe class CL1 to CL16. However, they do not need to vary. Just a combination of the respective tracking signal TR_S and the respective clocking signal CLK_S should be different from all the other probe classes CL. The clocking signal CLK_S assigned to the various probe classes CL1 to CL16 may be different for each probe class CL1 to CL16. However, they do not need to be different and in particular at least one probe class, in the example probe class CL3, CL9 and CL15, is assigned various clock signals CLK_S, which may also be referred to as intra-class clocking signal. The number of classes being assigned various clock signals CLK_S and resulting from that being controlled with a varying linear density within the respective probe class is not limited to the number shown by way of example in FIG. 11. More or less classes CL may be controlled with a varying linear density within the respective probe class CL. This embodiment gives even more freedom to optimize the data density towards very high data densities.

A program for controlling the probes 6 to being assigned to one of the probe classes CL is stored in the control and information processing unit 19 and is run during operation of the data storage device. The program is started in a step S1. In a step S2, a clocking signal CLK_S is assigned the respectively valid clocking signal CLK_S for the respective probe class CL. Depending on the embodiment, the clocking signal CLK_S is assigned an overall valid clocking signal CLK_S or one of the clocking signal CLK_S1 to CLK_S16 as shown in the tables of the FIGS. 8 to 11.

In a step S4, the heating pulse H_P is created in synchronization with the clocking signal CLK_S and is respectively applied to all the probes being operated in the respective probe class CL being operated in the write modus and being due to create a mark. Respectively, the appropriately parameterized heating pulse H_P for the read modus is applied to all of the probes 6 assigned to the respective probe class CL being currently operated in the read modus.

Depending on the selected writing or reading principles, the force pulse F_P is also created for respective the probe 6 of the respective probe class CL in timely synchronization with the clocking signal CLK_S. After step S6, the program continues in step S2, possibly after a given time out.

A further program for controlling the track movement is stored in the control and information processing unit 19 and is run during operation of the storage device. The program is started in a step S10. In a step S12, the tracking signal TR_S is assigned the tracking signal TR_S valid for the currently selected probe class CL1 to CL16. This allocation corresponds to the relationships between the respective tracking signals TR_S1 to TR_S16 given in the tables of the different embodiments according to FIGS. 8 to 11.

In a step S14, a respective position control parameter $Y_{CRTL}$ is calculated in dependence of the tracking signal TR_S. Preferably, the scanner 24 actuates a respective movement in the Y-direction then respectively. The control parameter Y_CTRL may also only be a feedback correction value superimposed on an open loop Y control parameter for the respective track TR1-TR6. The program is preferably continued in a step S12 after a given time out.

Negative effects of thermal expansion may be decreased by dividing the whole storage medium into given sections SEC1 to 4 and grouping the probes into the probe classes CL as described by way of example in the FIGS. 8 to 11 with the restriction that only probes 6 having fields allocated in one section SEC1 to SEC4 are grouped in one probe class. Each section SEC1 to SEC4 may then be treated concerning the formation of classes like the overall data storage device. The storage medium 2 may, however, alternatively also be divided into more or less sections than the four shown sections SEC1 to SEC4.

A preferred embodiment of the synthesizer 22 is shown in FIG. 12. The synthesizer 22 comprises a phase locked loop (PLL). The synthesizer 22 comprises a frequency divider 50, which detects the frequency of the input clock signal CLK_S which is by way of example the clocking signal CLK_S1. The frequency divider 50 divides the frequency of the clocking signal CLK_S1 by a given first counter value N1 and outputs that to a phase detection unit 54.

The synthesizer 22 further comprises a second frequency divider unit 52 which is inputted with a second given counter value N2 and the clocking signal CLK_S2 being outputted by the synthesizer 22. The clocking signal CLK_S2 is just shown by way of example as the outputted clocking signal. The outputted clocking signal may, however, also be one of the other clocking signals S3 to S16. The second frequency divider 52 divides the frequency of the clocking signal CLK_S2 by the second counter value N2 and outputs this result as a further input for the phase detection unit 54.

The phase detection unit 54 detects the phases between its inputs and creates from that a phase signal PH. The phase signal PH is then inputted into a controller unit 56. The controller unit 56 has preferably a proportional and a proportional or integral amplification characteristic. The output of the controller unit 56 is then inputted into an oscillator unit 58, which then creates the clocking signal CLK_S2. The various clocking signals CLK_S1 to CLK_S16 may be created by the synthesizer 22 by providing it with respective first and second counter values N1, N2 with the quotient of N2 and N1 being equal to a quotient of the frequencies of the outputted clocking signal and the inputted clocking signal of the synthesizer 22. In that way, for example, only the clocking signal CLK_S1 may be deduced from the respective clocking field, whereas the other clocking signal CLK_S2 to CLK_S16 can be obtained by providing the synthesizer 22 with respective first and second counter values N1, N2.

The invention claimed is:

1. A data storage device comprising a storage medium for storing data in the form of marks, an array of probes being mounted on a common frame, the common frame and the storage medium being designed for moving relative to each other for creating and detecting marks, with each probe being assigned a given field within the storage medium for creating and detecting marks in various tracks, a track density being representative of a distance between consecutive tracks, a linear density being representative of a minimum distance between consecutive marks within one track, the data storage device grouping the probes into various probe classes, each probe class being characterized in that all its assigned probes are controlled with a common track density and in that all its assigned probes are operated in respect of track movement simultaneously, and controlling each probe class with a different combination of said track density and said linear density.

2. The data storage device according to claim 1, wherein probes are controlled with a different areal density according to their probe class.

3. The data storage device according to claim 1, wherein probes in at least one probe class are controlled with a varying linear density within the respective probe class.

4. The data storage device according to claim 1 wherein all probe classes are controlled with the same track density and with different linear densities among said probe classes.

5. The data storage device according to claim 1 having at least one servo field being dedicated per track density being operated.

6. The data storage device according to claim 1, wherein said storage medium comprises a number of clocking fields being equal to the amount of different linear densities.

7. The data storage device according to claim 1, further comprising a synthesizer for creating clocking signals for implementing said different linear densities with said clocking signals being derived from a single clocking field.

8. The data storage device according to claim 7, wherein said synthesizer comprises a phase locked loop and frequency dividing units.

9. The data storage device according to claim 1, wherein said storage medium is partitioned into physical sections and said data storage device allocates all probes of each probe class only to one section each and controls each probe class within one physical section with a different combination of said track density and said linear density.

10. A method for operating a data storage device comprising a storage medium for storing data in the form of marks, an array of probes being mounted on a common frame, and the common frame and the storage medium move relative to each other for creating and detecting marks, the method comprising the steps of:
   assigning each probe a given field within the storage medium for creating and detecting marks in various tracks, a track density being representative of a distance between consecutive tracks, a linear density being representative of a minimum distance between consecutive marks within one track;
   grouping the probes into various probe classes; and
   controlling each probe according to its assigned probe class in that assigned probes are controlled with a common track density within its respective probe class and in that assigned probes are operated in respect of track movement simultaneously, and each probe class is controlled with a different combination of said track density and said linear density.

11. Method according to claim 10, further comprising controlling each probe class with a different areal density.

12. Method according to claim 10, further comprising controlling at least one probe class with a varying linear density within the respective probe class.

13. Method according to claim 10, further comprising controlling all probe classes with the same track density and with different linear densities among the probe classes.

14. Method according to claim 10, wherein the data storage device comprises a synthesizer, further comprising the steps of:
   operating said synthesizer for creating clocking signals for implementing said different linear densities, and
   deriving said clocking signals from a single clocking field.

15. Method according to claim 14, wherein said synthesizer comprises a phase locked loop and is provided with frequency-dividing units, further comprising the step of:
   operating said frequency dividing units with given divisors for obtaining the desired frequencies of said clocking signals.

16. Method according to claim 10, wherein the storage medium is partitioned into physical sections, further comprising the steps of:
   allocating all probes of each probe class only to one section each; and
   controlling each probe class within one physical section with a different combination of said track density and said linear density.

* * * * *